(12) United States Patent
Suenari et al.

(10) Patent No.: US 12,625,155 B2
(45) Date of Patent: May 12, 2026

(54) AUTOMATIC ANALYZER

(71) Applicant: HITACHI HIGH-TECH CORPORATION, Tokyo (JP)

(72) Inventors: Tsukasa Suenari, Tokyo (JP); Takenori Okusa, Tokyo (JP); Taichiro Yamashita, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 740 days.

(21) Appl. No.: 18/010,005

(22) PCT Filed: Feb. 5, 2021

(86) PCT No.: PCT/JP2021/004442
§ 371 (c)(1),
(2) Date: Dec. 13, 2022

(87) PCT Pub. No.: WO2022/009455
PCT Pub. Date: Jan. 13, 2022

(65) Prior Publication Data
US 2023/0324428 A1 Oct. 12, 2023

(30) Foreign Application Priority Data
Jul. 9, 2020 (JP) .............................. JP2020-118342

(51) Int. Cl.
*G01N 35/10* (2006.01)
*B01L 9/00* (2006.01)
(Continued)

(52) U.S. Cl.
CPC ....... *G01N 35/1002* (2013.01); *G01N 35/025* (2013.01); *G01N 2035/00316* (2013.01);
(Continued)

(58) Field of Classification Search
None
See application file for complete search history.

(56) References Cited

U.S. PATENT DOCUMENTS

| | | | |
|---|---|---|---|
| 5,489,414 | A | 2/1996 | Schreiber et al. |
| 2002/0025275 | A1 | 2/2002 | Oonuma et al. |

(Continued)

FOREIGN PATENT DOCUMENTS

| | | |
|---|---|---|
| JP | 56-51667 A | 5/1981 |
| JP | 10-48195 A | 2/1998 |

(Continued)

OTHER PUBLICATIONS

English translation of JP 2010-243191 (Year: 2010).*

(Continued)

*Primary Examiner* — P. Kathryn Wright
(74) *Attorney, Agent, or Firm* — MATTINGLY & MALUR, PC

(57) ABSTRACT

Provided is an automatic analyzer capable of reliably closing an openable lid provided in an opening for accessing a region covered by a cover. An automatic analyzer includes an incubator cover disposed to cover a preprocessing region provided on an operation surface on a housing, an openable lid disposed to openably cover an opening portion provided in the incubator cover in order to access the inside from the outside of the preprocessing region, and a safety cover disposed to cover upper portions of the operation surface and the preprocessing region, and the openable lid is moved to a closed position in association with movement of the safety cover from an opened position to the closed position in a case where the openable lid is at the opened position and the safety cover is at the opened position.

5 Claims, 10 Drawing Sheets

(51) Int. Cl.
    *G01N 35/02*     (2006.01)
    *G01N 35/00*     (2006.01)
    *G01N 35/04*     (2006.01)

(52) U.S. Cl.
    CPC .............. *G01N 2035/00356* (2013.01); *G01N 2035/0405* (2013.01); *G01N 2035/0443* (2013.01)

(56)           References Cited

U.S. PATENT DOCUMENTS

| | | | |
|---|---|---|---|
| 2013/0084212 | A1 | 4/2013 | Kurono et al. |
| 2014/0241945 | A1 | 8/2014 | Oonuma et al. |
| 2015/0251184 | A1 | 9/2015 | Watanabe et al. |

FOREIGN PATENT DOCUMENTS

| | | | | |
|---|---|---|---|---|
| JP | 2004-101295 | A | | 4/2004 |
| JP | 3141576 | U | | 5/2008 |
| JP | 2010243191 | A | * | 10/2010 |
| JP | 2013-72799 | A | | 4/2013 |
| JP | 2013-76678 | A | | 4/2013 |
| JP | 2017-202072 | A | | 11/2017 |
| KR | 10-2020-0070897 | A | | 6/2020 |
| WO | 2018-230198 | A1 | | 12/2018 |

OTHER PUBLICATIONS

International Search Report of PCT/JP2021/004442 dated Apr. 13, 2021.
Extended European Search Report received in corresponding European Application No. 21836832.2 dated Jun. 4, 2024.

* cited by examiner

[FIG. 1]
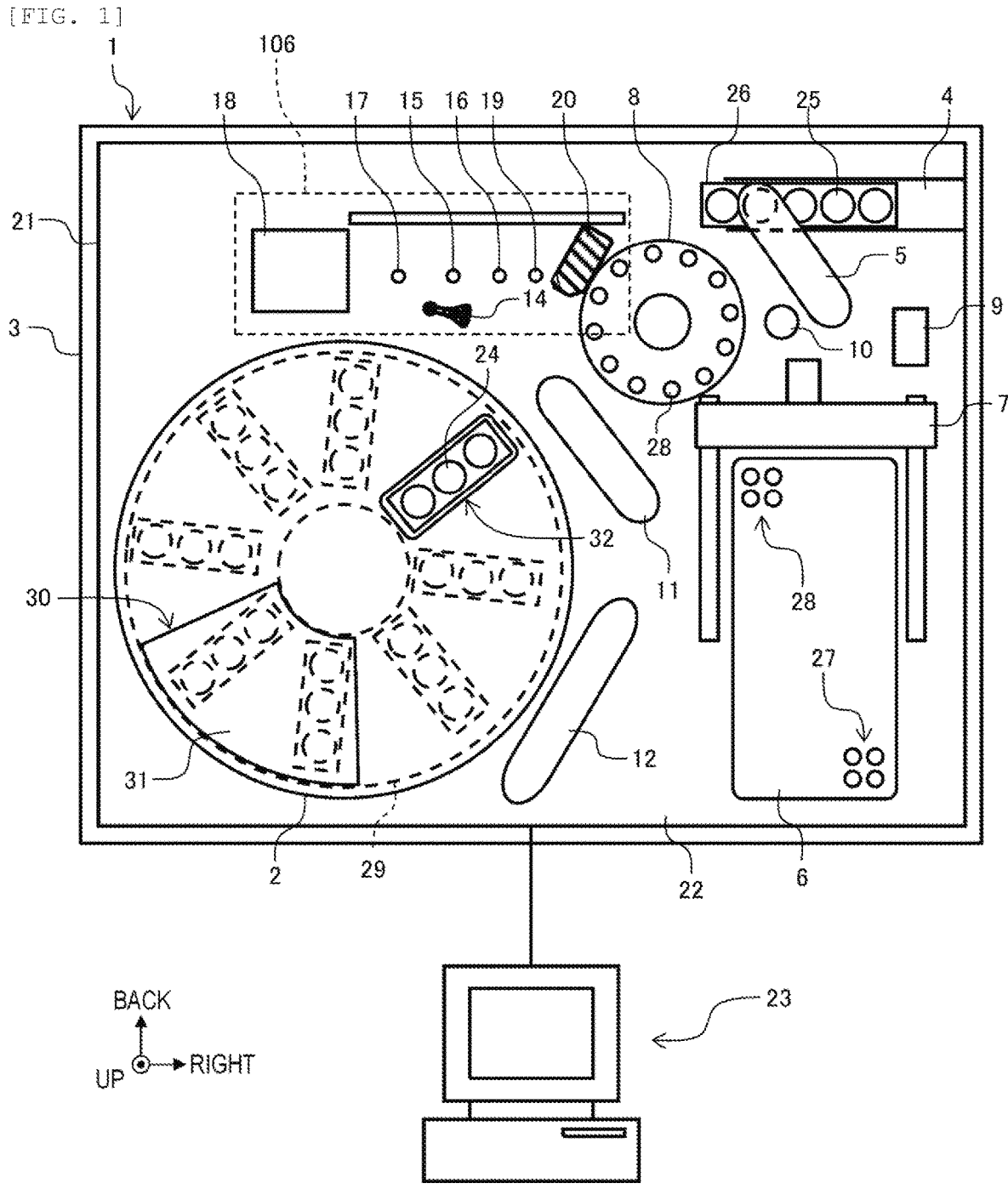

[FIG. 2]
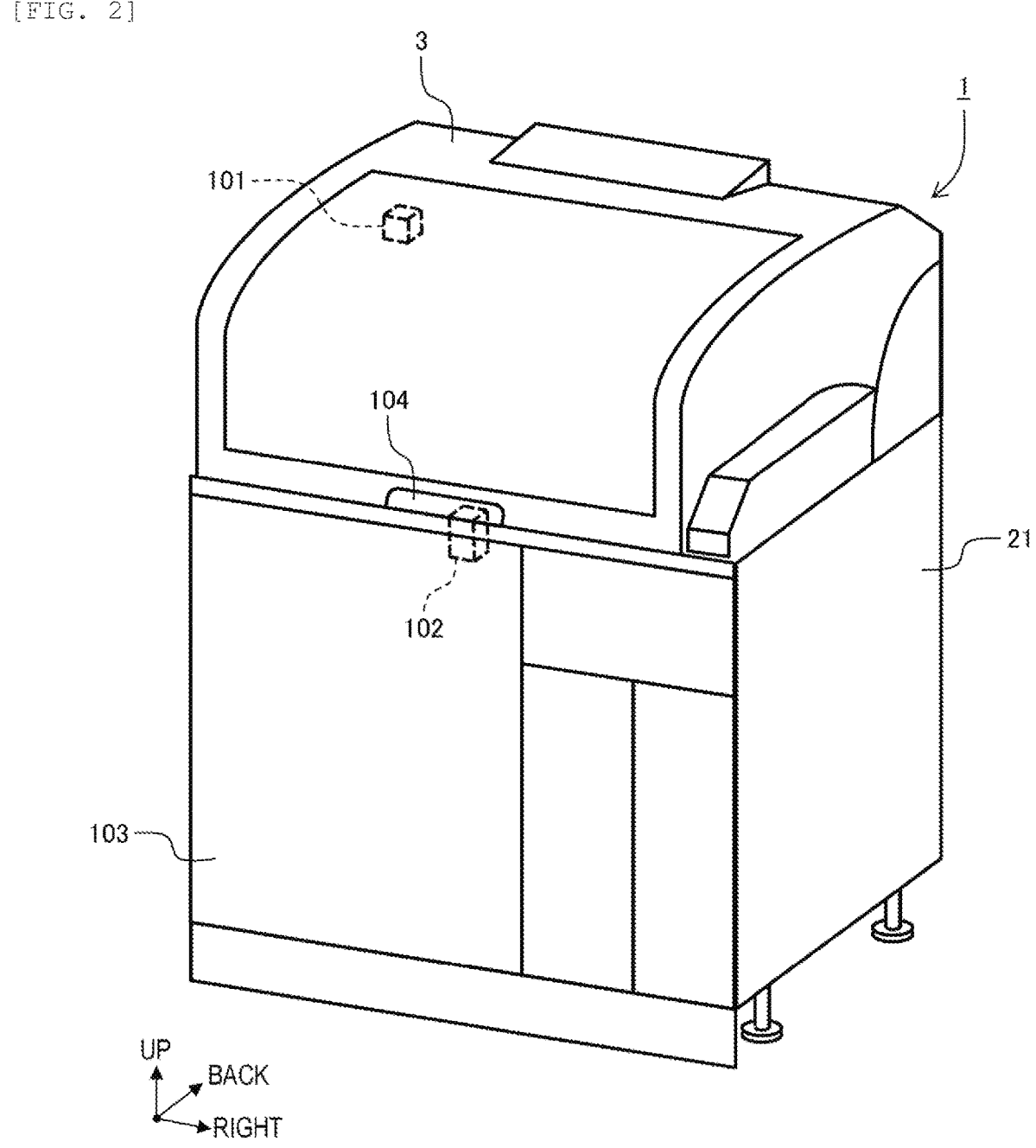

[FIG. 3]
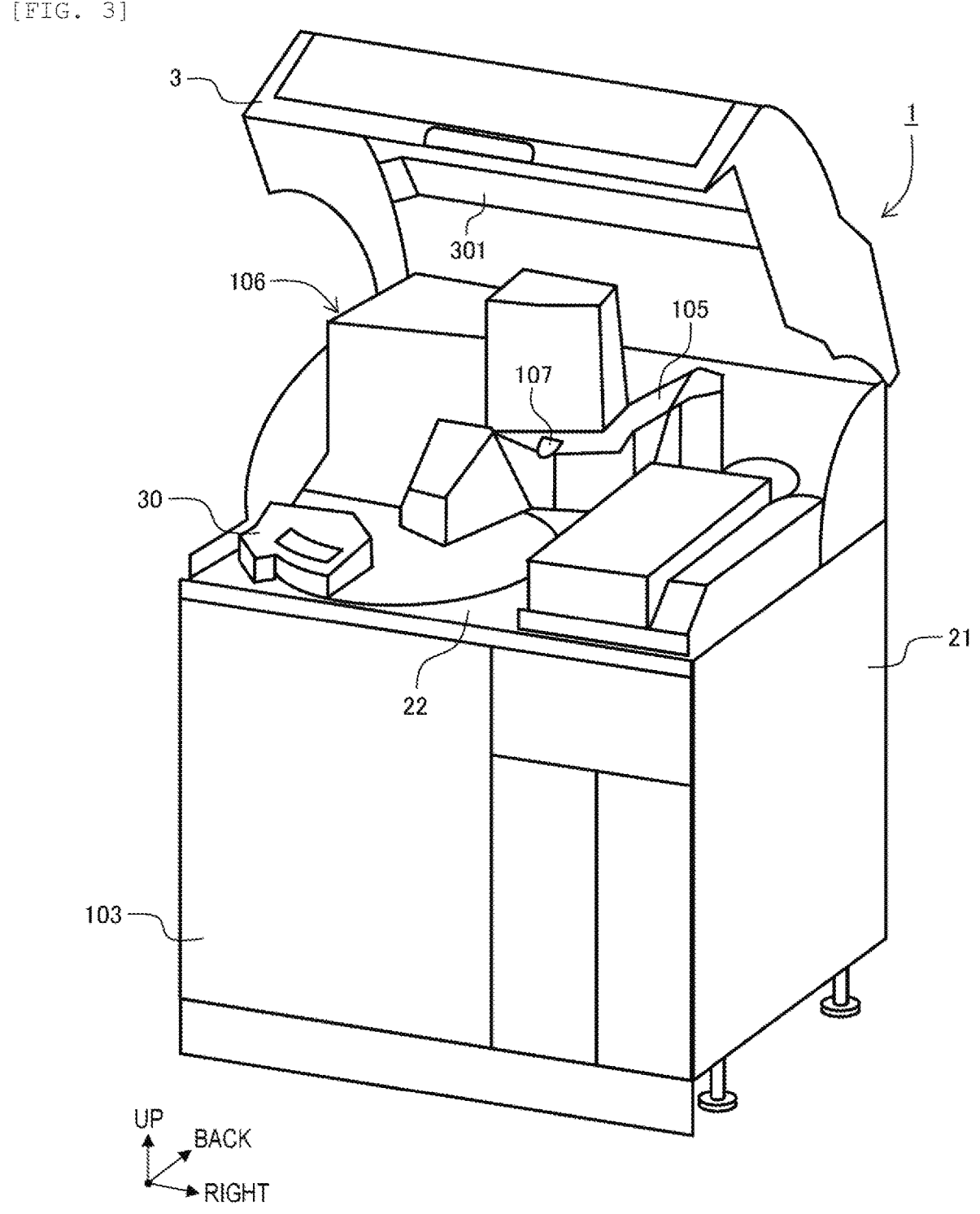

[FIG. 4]
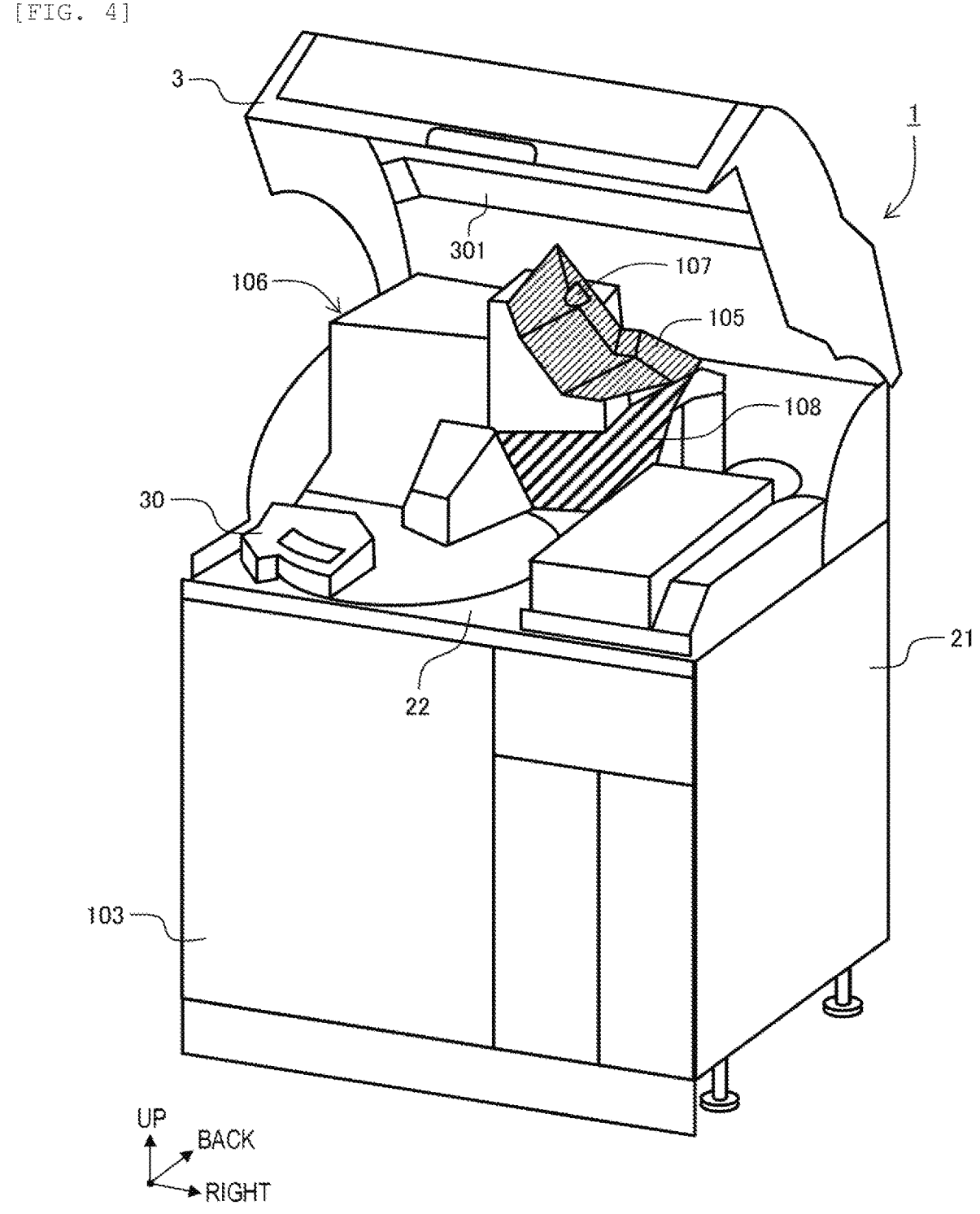

[FIG. 5]
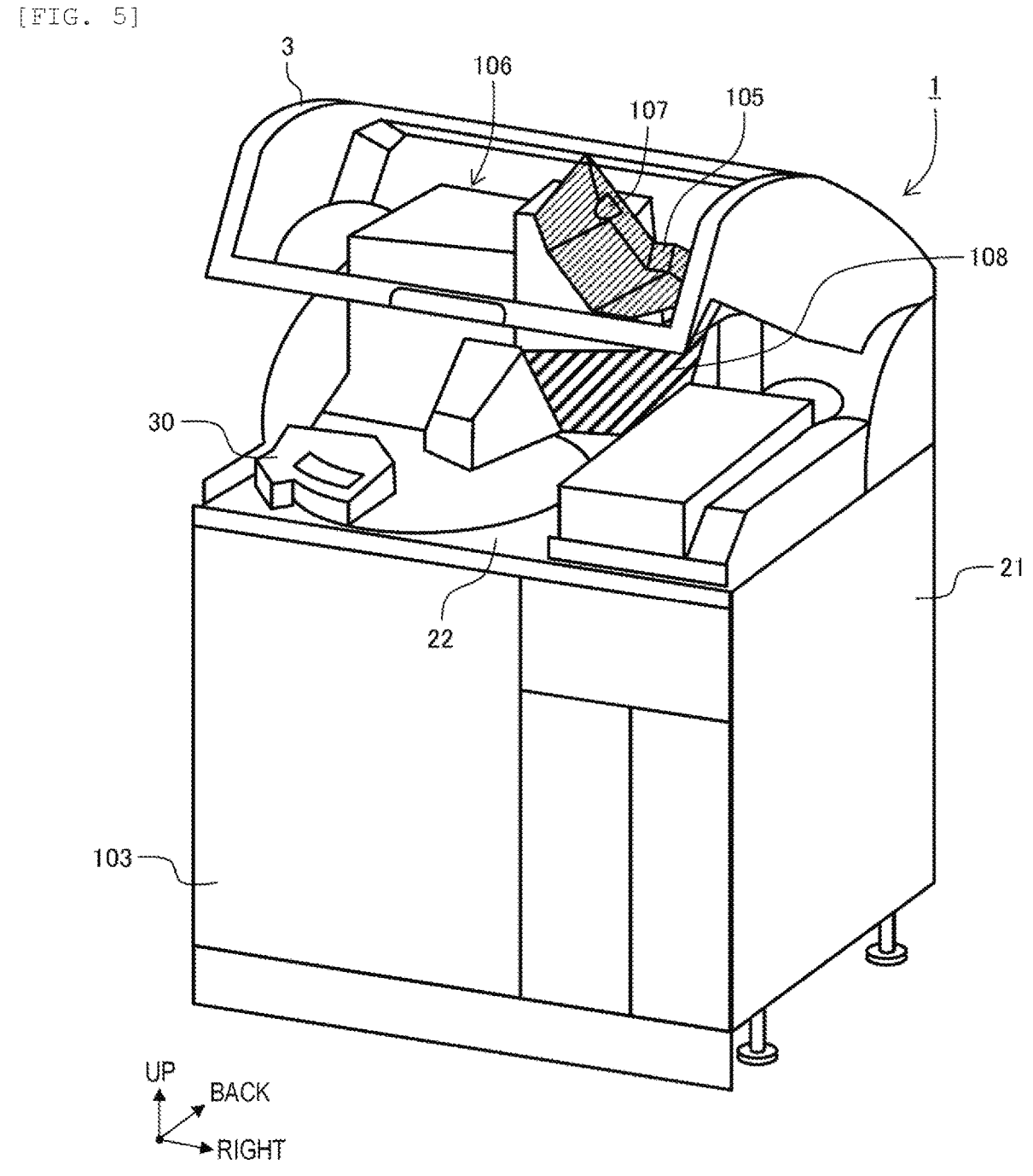
UP
BACK
RIGHT

[FIG. 6]
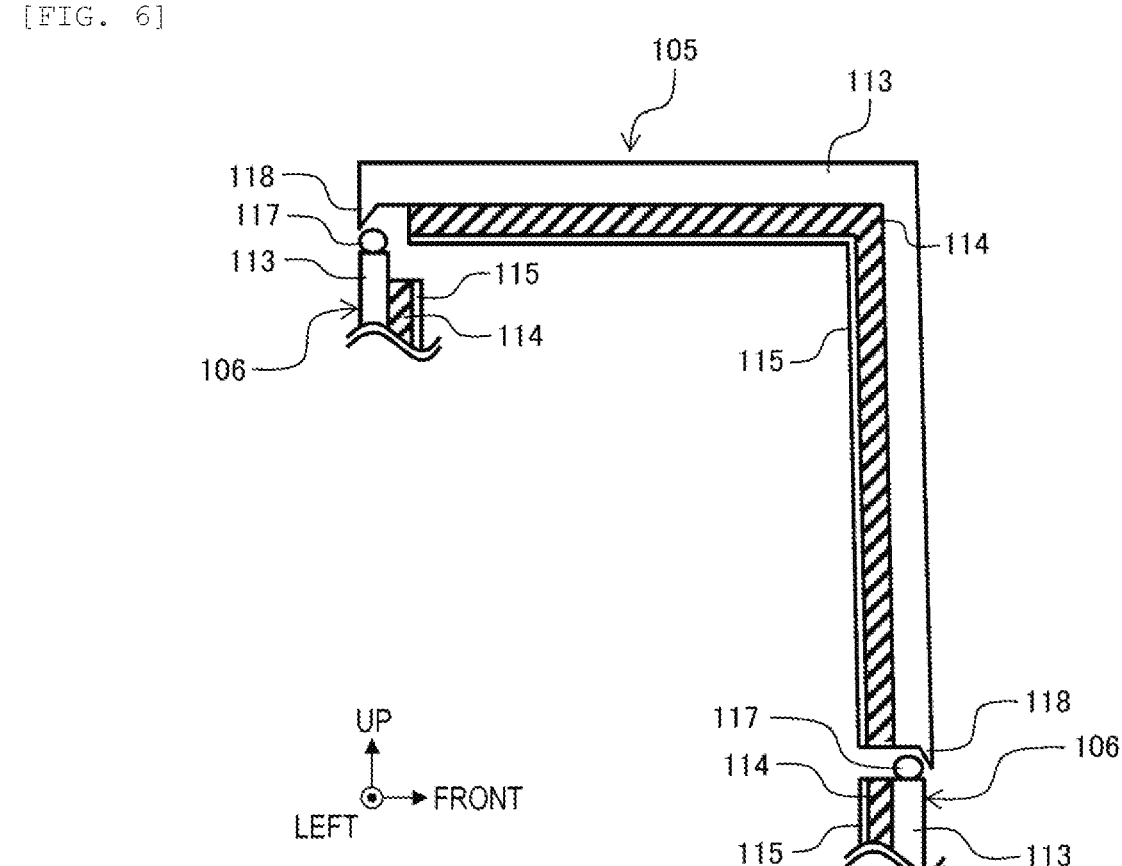

[FIG. 7]
[FIG. 8]
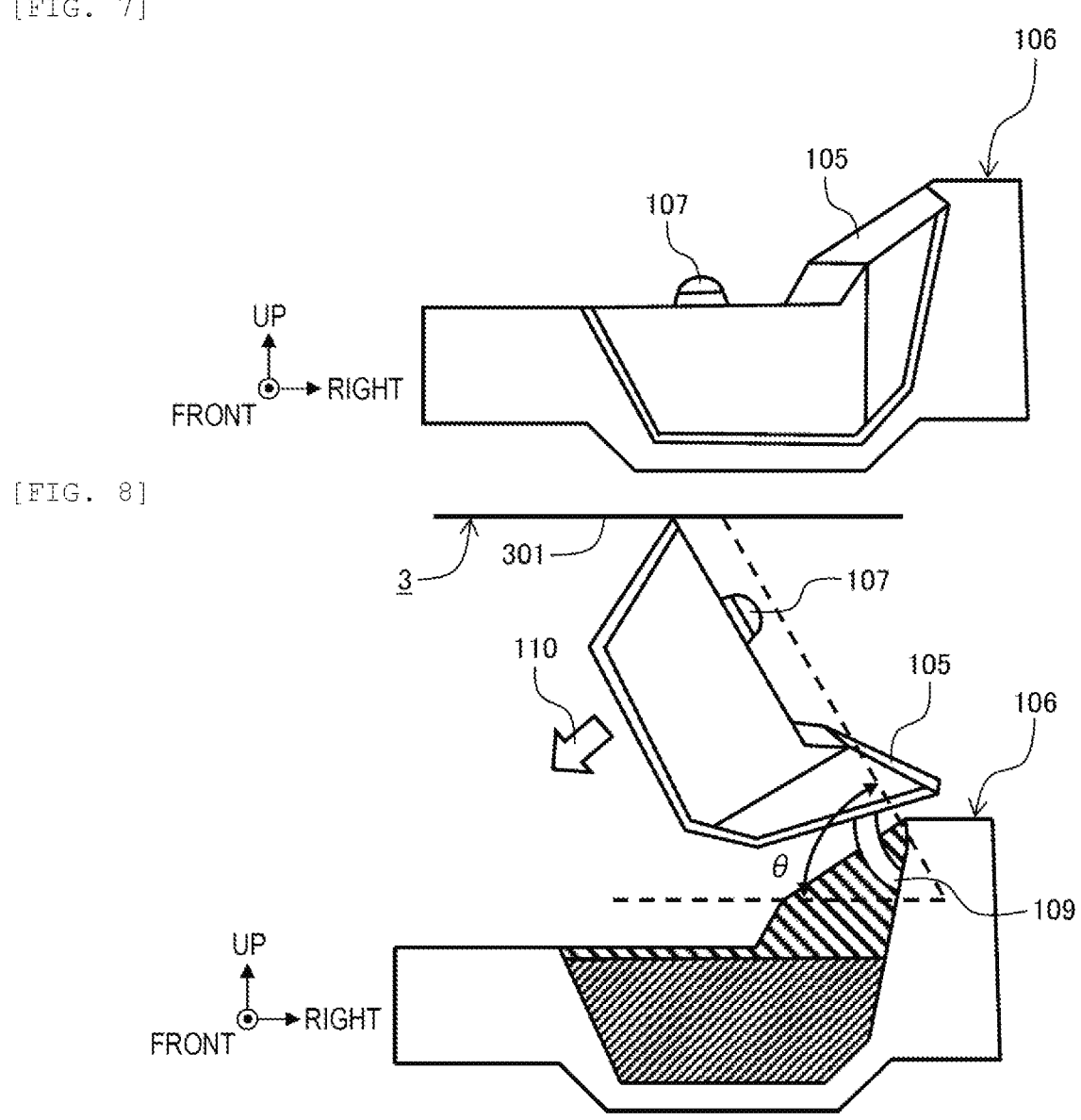

[FIG. 9]
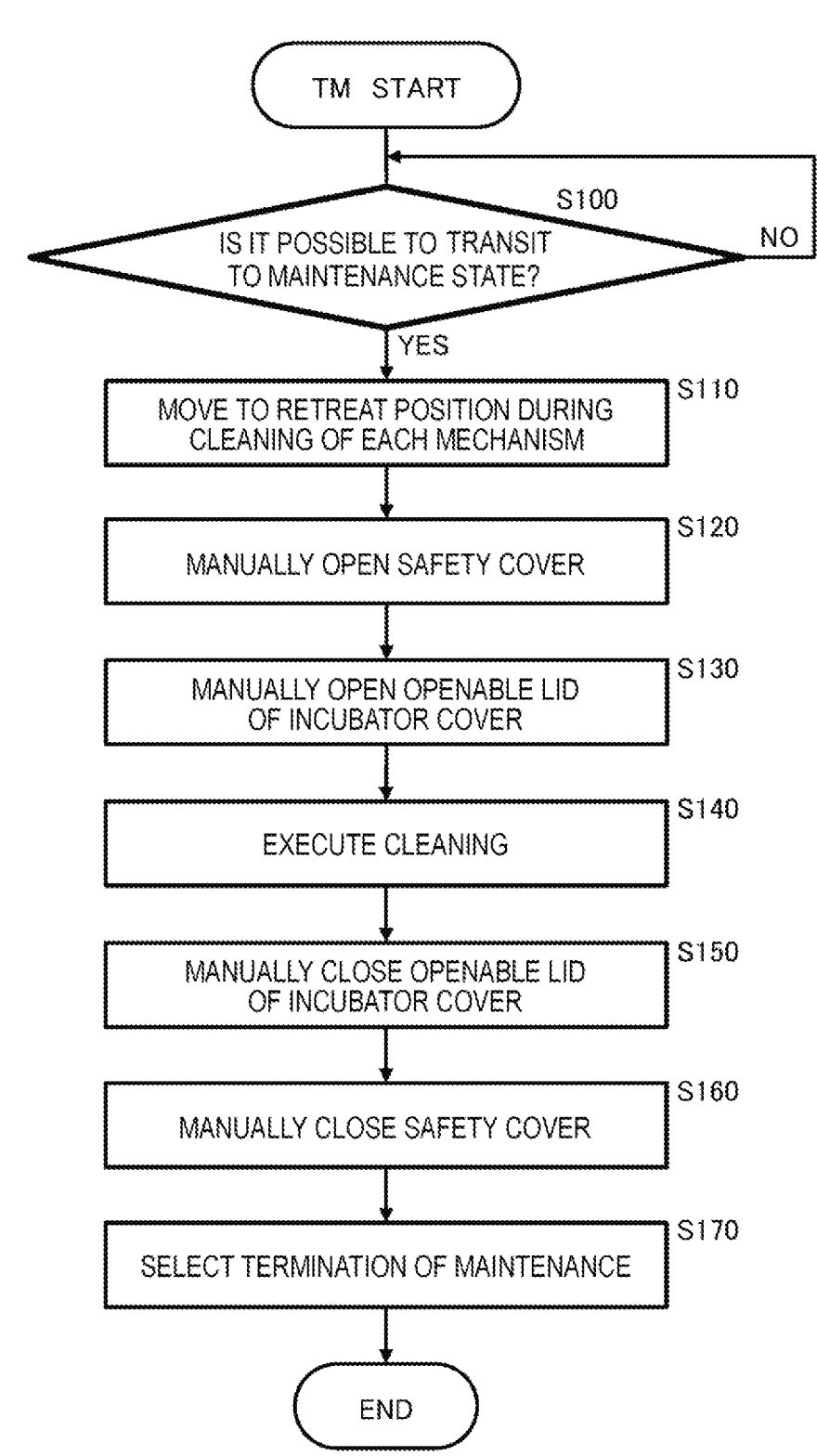

[FIG. 10]
[FIG. 11]
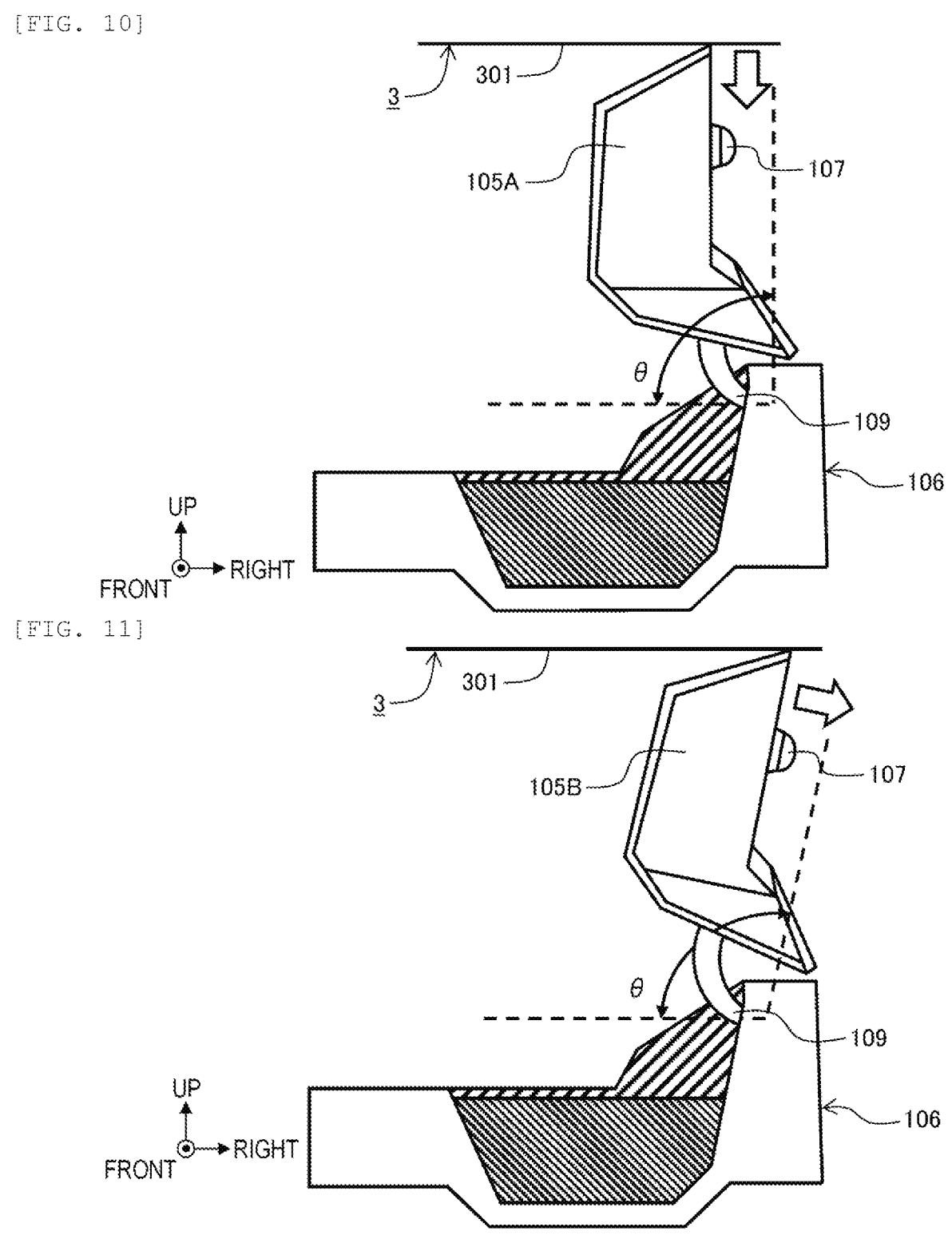

[FIG. 12]
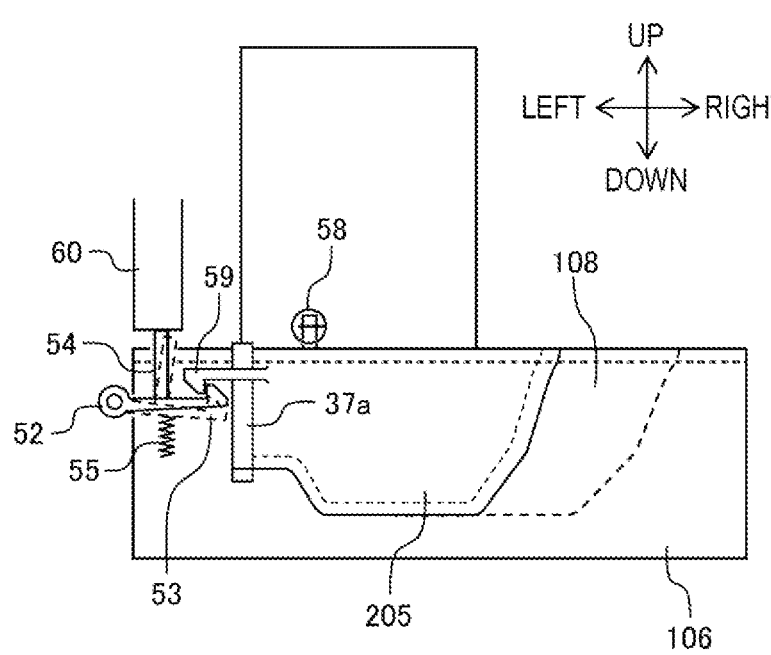
[FIG. 13]
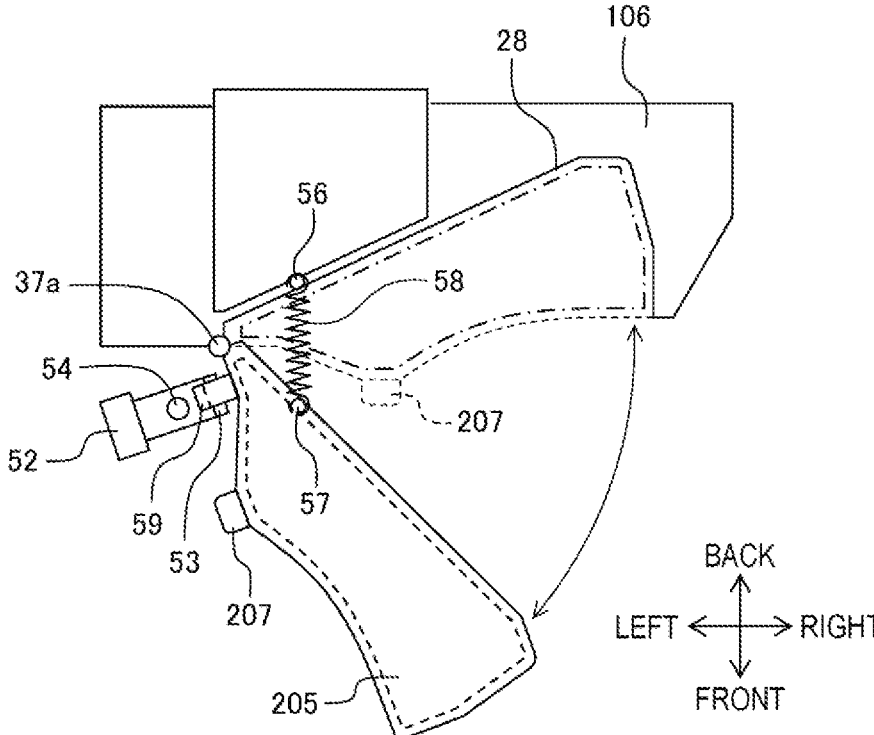

AUTOMATIC ANALYZER

TECHNICAL FIELD

The present invention relates to an automatic analyzer.

BACKGROUND ART

An automatic analyzer is a device that performs a qualitative analysis or a quantitative analysis on a certain component included in a biological sample, such as blood, urine, and spinal fluid, and is an essential device in facilities that need to process many patient specimens in a short time, such as a hospital and a medical testing facility.

In such an automatic analyzer, in order to reduce an effect of an external environment on an analysis result, preprocessing, such as dispensing and stirring of a reaction liquid and a reagent, is performed in a preprocessing region that is environmentally controlled, such as light shielded and temperature adjusted. For example, Patent Literature 1 discloses an automatic analyzer. The automatic analyzer includes a sample disk, a reagent disk, a reaction disk, and a plurality of dispensing mechanisms, that are disposed on a top face of a main-body casing, a scattered light measurement unit disposed inside the main-body casing, and a protective cover. The sample disk holds a plurality of samples, the reagent disk holds a plurality of types of reagent, the reaction disk holds a plurality of reaction cells, and the plurality of dispensing mechanisms each include an arm that rotates and a nozzle fixed to the arm and dispensing the samples and/or the reagents to the reaction cells held at the reaction disk. The scattered light measurement unit includes a light source that irradiates light to the reaction cells and a photoreceptor that receives scattered light generated from a reaction liquid in the reaction cells irradiated with the light. The protective cover is disposed to cover the top face of the main-body casing, and includes a light-shielding part to block external light and a see-through part enabling see therethrough of inside. The light-shielding part covers at least an area of the reaction disk corresponding to an area above the scattered light measurement unit.

CITATION LIST

Patent Literature

Patent Literature 1: Japanese Unexamined Patent Application Publication No. 2013-72799

SUMMARY OF INVENTION

Technical Problem

In order to maintain the measurement results at high accuracy in the automatic analyzer, maintenance work, such as cleaning and parts replacement inside the preprocessing region covered by the cover and environmentally controlled, is required to be performed periodically or according to usage conditions. An openable lid disposed at an opening portion on an upper portion or a front surface of the cover covering the preprocessing region is opened and maintenance personnel access the inside of the preprocessing region from a clearance between the openable lid and the cover via the opening portion, and thus, the maintenance work is performed. After the maintenance work is completed and the openable lid is closed, the cover and the openable lid keep the inside of the preprocessing region in a light-shielded and temperature-adjusted state.

For example, when the openable lid of the preprocessing region is of a removable type, however, the openable lid removed for opening the opening portion when the maintenance work is started may be left unattached after the maintenance work is terminated. In case the preprocessing is performed with the opening portion of the preprocessing region left unclosed, the preprocessing is performed with insufficient light shielding and temperature adjustment in the preprocessing region, which possibly deteriorates the accuracy of the analysis results.

The present invention is made in consideration of the above, and one of its objectives is to provide an automatic analyzer capable of reliably closing an openable lid provided in an opening for accessing a region covered by a cover.

Solution to Problem

The present application includes a plurality of means to solve the above-described problems, and one of such examples includes an automatic analyzer including: a housing that accommodates at least a portion of an analyzer analyzing a specimen to be analyzed; a first region cover disposed to cover a first region provided on an operation surface on the housing so as to include a portion of the analyzer; an openable lid that is disposed to openably cover an opening portion provided in the first region cover in order to access an inside from an outside of the first region, and is provided to be rotatable between a first fully opened position and a first fully closed position with respect to the first region cover at an end of the opening portion, the openable lid having an open holding function for holding the openable lid at the first fully opened position in a case where one end of the openable lid on a side distant from a center of rotation of the openable lid is positioned higher than a reference height determined in advance; and a second region cover that is disposed to cover upper portions of the operation surface and the first region cover and provided to be rotatable between a second fully opened position and a second fully closed position with respect to the housing at an end of the operation surface. The openable lid is moved to the first fully closed position in association with movement of the second region cover from the second fully opened position to the second fully closed position in a case where the openable lid is at the first fully opened position and the second region cover is at the second fully opened position.

Advantageous Effects of Invention

The present invention ensures reliably closing the openable lid provided in the opening for accessing the region covered by the cover.

BRIEF DESCRIPTION OF DRAWINGS

FIG. 1 is a plan view schematically illustrating a configuration of an operation surface of an automatic analyzer.

FIG. 2 is a perspective view illustrating the external appearance of the automatic analyzer and illustrating a state where a safety cover is closed.

FIG. 3 is a perspective view illustrating the external appearance of the automatic analyzer and illustrating a state where the safety cover is at a fully opened position.

FIG. 4 is a perspective view illustrating the external appearance of the automatic analyzer and illustrating a state where the safety cover and an openable lid are at a fully opened position.

FIG. 5 is a perspective view illustrating the external appearance of the automatic analyzer and illustrating a mode in which the safety cover is moved from the state illustrated in FIG. 4 to a fully closed position.

FIG. 6 is a longitudinal sectional view illustrating an incubator cover and the openable lid.

FIG. 7 is a front view illustrating the incubator cover and the openable lid which are taken out and illustrating a case where the openable lid is at a closed position.

FIG. 8 is a front view illustrating the incubator cover and the openable lid which are taken out and illustrating a case where the openable lid is at an opened position.

FIG. 9 is a flowchart illustrating a maintenance processing procedure performed by an operator.

FIG. 10 is a front view illustrating an incubator cover and an openable lid according to a first comparative example and illustrating a case where the openable lid is at an opened position.

FIG. 11 is a front view illustrating an incubator cover and an openable lid according to a second comparative example and illustrating a case where the openable lid is at an opened position.

FIG. 12 is a front view illustrating an incubator cover and an openable lid which are taken out according to a second embodiment and illustrating a case where the openable lid is at an opened position.

FIG. 13 is a top view illustrating the incubator cover and the openable lid which are taken out according to the second embodiment and illustrating a case where the openable lid is at an opened position.

DESCRIPTION OF EMBODIMENTS

Embodiments of the present invention will be described with reference to the drawings.

First Embodiment

A first embodiment of the present invention will be described in detail with reference to FIG. 1 to FIG. 11.

FIG. 1 is a plan view schematically illustrating a configuration of an operation surface of an automatic analyzer according to the embodiment. FIG. 2 to FIG. 5 are perspective views illustrating an external appearance of the automatic analyzer according to the embodiment. FIG. 2 is a drawing illustrating a state where a safety cover is closed. FIG. 3 is a drawing illustrating a state where the safety cover is at a fully opened position. FIG. 4 is a drawing illustrating a state where the safety cover and an openable lid are at a fully opened position. FIG. 5 is a drawing illustrating a state where the safety cover is moved from the state illustrated in FIG. 4 to a fully closed position. Hereinafter the description will be made with a downward direction in FIG. 1 defined as a forward direction of the automatic analyzer, a rightward direction in FIG. 1 defined as a rightward direction, and a near side direction on the paper in FIG. 1 defined as an upward direction. A location of a host computer in FIG. 1, however, is not specified.

In FIG. 1, an automatic analyzer 1 includes a reagent cold storage 2, a safety cover 3, a sample conveyance mechanism 4, a sample dispensing mechanism 5, a tip magazine 6, a tip conveyance mechanism 7, an incubator 8, a sample dispensing tip buffer 9, a tip disposal hole 10, a reagent dispensing probe 11, a reagent stirring mechanism 12, a washing mechanism 13, a reaction liquid aspiration discharge probe 14, a reaction liquid washing discharge aspiration position 15, a reaction liquid stirring mechanism 16, a reaction liquid aspiration position 17, a detection portion 18, a reaction container disposal hole 19, a reaction container conveyance mechanism 20, an operation surface 22, a host computer (operation portion) 23, reagent containers 24, sample containers 25, a sample rack 26, sample dispensing tips 27, reaction containers 28, a reagent disk 29, a reagent container loading port 30, a reagent container loading port lid 31, and a reagent dispensing position 32. The host computer (operation portion) 23 is to control the entire operation of the automatic analyzer 1.

As illustrated in FIG. 1 to FIG. 5, the automatic analyzer 1 includes a housing configured of a side cover 21 (only a right side surface is illustrated), a front cover 103, a rear cover (not illustrated), a housing frame (not illustrated), and the like so as to accommodate at least a portion of the analyzer analyzing a specimen to be analyzed, an incubator cover 106 (a first region cover) disposed to cover a preprocessing region (a first region) provided on the operation surface 22 on the housing so as to include a portion of the analyzer, an openable lid 105 disposed to openably cover an opening portion 108 provided in the incubator cover 106 (the first region cover) in order to access the inside from the outside of the preprocessing region (the first region), and is provided to be rotatable between a first fully opened position (See FIG. 4) and a first fully closed position (See FIG. 3) with respect to the incubator cover 106 (the first region cover) at an end of the opening portion 108, and the safety cover 3 (a second region cover) disposed to cover upper portions of the operation surface 22 and the incubator cover 106 (the first region cover) and provided to be rotatable between a second fully opened position and a second fully closed position with respect to the housing at an end (for example, an end in a rear side) of the operation surface 22.

The safety cover 3 is supported on one side of the upper surface of the housing by, for example, a hinge support shaft, and is provided to be rotatable about the hinge support shaft, thus being configured to be openable/closable. That is, the safety cover 3 is pivotally supported to be rotatable between the closed position (the second fully closed position) and the opened position (the second fully opened position) with the hinge support shaft as the center of rotation. The closed position of the safety cover 3 is specified by a lower end portion being supported by a table surface (the operation surface 22). The opened position of the safety cover 3 is specified by an opening limit by a configuration of a mechanical stopper (not illustrated).

The safety cover 3 is provided with an interlock 101. The interlock 101 has an open/close detection sensor function, and when it detects that the safety cover 3 is opened, driving voltages of respective drive units in the automatic analyzer 1 are cut off to stop operations of the respective drive units of the automatic analyzer 1. This ensures eliminating risks of an operator contacting the operation target while the analyzer is operating.

The safety cover 3 at the closed position has, for example, an end on the opposite side of the center of rotation provided with a solenoid lock mechanism 102 that can latch between the housing and the safety cover 3, which latches the safety cover 3 by energizing the solenoid lock mechanism 102 during the operation of the automatic analyzer 1 to prevent the opening operation of the safety cover 3 by the operator and maintain the closed state. This ensures preventing erroneous operations, for example, the operator unintentionally opening the safety cover 3 during the analysis operation and stopping the analyzer, thus preventing to a process relating to the restart and reporting delay to a patient. While the analysis operation of the automatic analyzer 1 is stopped, the energization to the solenoid lock mechanism 102 is stopped and the latch is released, therefore, the opening operation of the safety cover 3 can be performed.

The safety cover 3 is assisted in opening/closing operations by, for example, a gas damper, to be openable to a reference height as the opened position with a little force and maintains the opened position in the opened position, and is designed with a force balance with which it does not rotate in the closing direction by its own weight. However, the safety cover 3 can also be moved to the closed position with a little force. The operator can clean and replace various operational mechanism groups disposed on the operation surface 22, clean the operation surface 22, and replace the reagent containers 24 by gripping and lifting a handle portion 104 disposed in front of the safety cover 3, while moving the safety cover 3 to the opened position, and inserting his/her arms or upper body from a clearance between the operation surface 22 and the front side of the safety cover 3. Therefore, a specified height for the safety cover 3 to maintain the opened position is preferred to be designed to a height with which a person relatively small in stature can also reach and close the safety cover 3 and a height with which a person relatively high in stature can also keep a sufficient work space by taking, for example, an average height and variations of people that potentially be an operator into consideration.

The sample conveyance mechanism 4 is configured of, for example, a belt conveyor and a rack handler, and conveys the sample rack 26 that provides the sample containers 25, in which samples, such as specimens, are housed, in a hanging manner in the automatic analyzer 1 to move it to a range of motion of the sample dispensing mechanism 5.

On the tip magazine 6, the plurality of unused sample dispensing tips 27 and the plurality of unused reaction containers 28 are placed. The tip magazine 6 is configured to be attachable and removable to and from the automatic analyzer 1 and is arranged on the upper surface of the automatic analyzer 1 by the operator in a state where the sample dispensing tips 27 and the reaction containers 28 are placed.

The tip conveyance mechanism 7 is configured to be movable in the planar direction and the Z-axis direction, and is configured movable above the tip magazine 6, a portion of the incubator 8, the sample dispensing tip buffer 9, and the tip disposal hole 10. The tip conveyance mechanism 7 grips the reaction containers 28 one by one from the tip magazine 6 and moves them to empty slots in the incubator 8. The tip conveyance mechanism 7 grips the sample dispensing tips 27 one by one from the tip magazine 6 and moves them to the sample dispensing tip buffer 9.

The sample dispensing tip buffer 9 is a buffer on which the sample dispensing tips 27 gripped and conveyed by the tip conveyance mechanism 7 are temporarily placed. The sample dispensing tips 27 are configured to be attachable and removable to and from the sample dispensing mechanism 5. The sample dispensing mechanism 5 with no sample dispensing tips 27 loaded moves to the sample dispensing tip buffer 9, and thus, the unused sample dispensing tips 27 can be loaded.

The incubator 8 has a disk shape and is configured to be revolvable in the circumferential direction. The incubator 8 can hold the plurality of reaction containers 28 along the circumferential direction. Each of the reaction containers 28 can be moved to the predetermined position on a revolution path by the revolution of the incubator 8. Note that the incubator 8 has a temperature control function and a heat insulating function for controlling temperature.

The sample dispensing mechanism 5 moves to an upper portion of the sample dispensing tip buffer 9 with no sample dispensing tips 27 loaded to load any one of the unused sample dispensing tips 27, and moves to an upper portion of the sample containers 25 to aspirate a sample into the sample dispensing tip 27. Afterward, the sample dispensing mechanism 5 moves to an upper portion of the reaction container 28 mounted on the incubator 8 to discharge a composition inside the sample dispensing tip 27 into the reaction container 28. Afterward, the sample dispensing mechanism 5 moves to an upper portion of the tip disposal hole 10, and causes the sample dispensing tip 27 to come off and drop into the tip disposal hole 10.

The reagent cold storage 2 has a cylindrical shape with an upper open end sealed by a cover and internally houses the reagent disk 29. The cover on the upper surface of the reagent cold storage 2 is provided with the reagent container loading port 30 for attaching and removing the reagent containers 24 to and from the reagent disk 29. The reagent container loading port 30 is provided with the openable and closable reagent container loading port lid 31. The reagent cold storage 2 has a temperature control function and a heat insulating function for controlling the reagent containers 24 to a constant temperature.

The reagent disk 29 has slots that radially hold the plurality of reagent containers 24 along the circumferential direction. The reagent disk 29 is configured to be revolvable about a center axis extending in the vertical axis direction. Revolving of the reagent disk 29 in the circumferential direction ensures moving each of the reagent containers 24 to the predetermined position on the conveyance path. For example, revolving of the reagent disk 29 ensures moving the reagent container 24 housing the target reagent to the reagent dispensing position 32. The reagent dispensing position 32 of the reagent disk 29 is provided with an opening that can aspirate the reagent in the reagent container 24 with the reagent dispensing probe 11.

The reagent dispensing probe 11 is, for example, configured to extend in the horizontal direction to be in an arm shape with one end rotatable in the horizontal direction with respect to a revolution shaft extending in the vertical direction, and is configured to be rotatable in the horizontal direction by, for example, an actuator, not illustrated, and movable in the vertical direction. The reagent dispensing probe 11 aspirates a predetermined amount of the reagent with a reagent dispensing pipette (not illustrated) disposed at a lower portion of the end (the other end) on the opposite side of the revolution shaft from the reagent container 24 conveyed to the reagent dispensing position 32 by the reagent disk 29 and dispenses the predetermined amount of the reagent into the reaction container 28 held onto the incubator 8.

The reagent stirring mechanism 12 is, for example, a magnetic particle stirring arm extending in the horizontal direction with one end rotatable in the horizontal direction with respect to a revolution shaft extending in the vertical direction, and is configured to move the other end to an upper portion of the reagent dispensing position 32 by rotational movement. A magnetic particle stirring mechanism in, for example, a paddle shape or a spiral shape is disposed at a lower portion of the end (the other end) on the opposite side of the revolution shaft of the magnetic particle stirring arm of the reagent stirring mechanism 12. The reagent stirring mechanism 12 stirs the reagent by moving down the magnetic particle stirring mechanism into the reagent containing magnetic particles, and, for example, causing it to revolve. Note that the reagent stirring mechanism 12 stirs the reagent immediately before the reagent dispensing by the reagent dispensing probe 11 in order to prevent precipitation of the magnetic particles in the reagent. The reagent stirring mechanism 12 moves the magnetic particle stirring mechanism to a washing mechanism (not illustrated) in which cleaning fluid is contained after the stirring of the reagent to clean the magnetic particle stirring mechanism by causing it to revolve.

The reaction container 28 in the incubator 8 is controlled to a predetermined temperature after the predetermined reagent and sample are dispensed, and a reaction is accelerated for a predetermined period.

The reaction container conveyance mechanism 20 conveys the reaction container 28 between the incubator 8, the reaction liquid washing discharge aspiration position 15, the reaction liquid stirring mechanism 16, the reaction liquid aspiration position 17, and the reaction container disposal hole 19.

When the reaction container 28 in which a reaction liquid between the reagent and the sample is housed is conveyed from the incubator 8 to the reaction liquid washing discharge aspiration position 15 by the reaction container conveyance mechanism 20, the reaction liquid aspiration discharge probe 14 aspirates an unnecessary portion of the reaction liquid in the reaction container 28, and discharges a buffer solution into the reaction container 28.

The reaction liquid stirring mechanism 16 stirs the reaction liquid inside the reaction container 28 when the reaction container 28 is conveyed from the reaction liquid washing discharge aspiration position 15 by the reaction container conveyance mechanism 20.

When the reaction container 28 in which the reaction liquid has been stirred by the reaction liquid stirring mechanism 16 is conveyed to the reaction liquid aspiration position 17 by the reaction container conveyance mechanism 20, the detection portion 18 aspirates the reaction liquid inside the reaction container 28 with an aspiration mechanism, not illustrated, and detects physical properties of the reaction liquid. Examples of the physical properties of the reaction liquid the detection portion 18 detects include, for example, an amount of luminescence, an amount of scattered light, an amount of transmitted light, a current value, and a voltage value, but not limited to these. Note that the detection portion 18 may carry out an analysis with the reaction liquid held inside the reaction container 28.

The reaction container conveyance mechanism 20 moves the reaction container 28 housing the reaction liquid that has been finished with the analysis by the detection portion 18 to an upper portion of the reaction container disposal hole 19 and discards it into the reaction container disposal hole 19. Note that, depending on the type of measurement, one reaction container 28 may be used for multiple times of measurements. In such a case, after the reaction liquid in the reaction container 28 that has been finished with the analysis is discarded, the reaction container 28 is cleaned.

Here, the incubator 8, the reaction liquid aspiration discharge probe 14, the reaction liquid washing discharge aspiration position 15, the reaction liquid stirring mechanism 16, the reaction liquid aspiration position 17, the reaction container conveyance mechanism 20, and the like, as the configurations and positions for performing the preprocessing on the sample before the detection by the detection portion 18 are disposed in the preprocessing region (the first region) covered by the incubator cover 106 together with the detection portion 18. The preprocessing region is a region that requires the environmental controls, such as the temperature adjustment and the light shielding, and in order to accurately perform the temperature adjustment and the light shielding, the incubator cover 106 and the openable lid 105 (described below) are provided with heat-insulating properties and light-shielding properties. In the preprocessing region inside the incubator cover 106, each mechanism relating to the preprocessing is compactly disposed so as to be configured to make the preprocessing region as small as possible. When a heat-insulated space like the preprocessing region is large, a temperature distribution easily occurs, which makes it difficult to control the temperature inside the space uniform, and also, lengthens the period it takes until the set temperature is reached, and therefore, a warm-up period until the measurement is possible lengthens. Therefore, it is important to reduce the preprocessing region as the heat-insulated space as much as possible. The preprocessing region includes the detection portion 18, and therefore, it is a light-shielded space. The incubator cover 106 and the openable lid 105 have inner surfaces in a black color to reduce the reflection of stray light.

Each configuration disposed inside the preprocessing region (the first region) needs to be maintained periodically or as necessary. The operator pinches an openable lid knob 107 disposed in a front portion of the openable lid 105 of the incubator cover 106 and moves it upward to move the openable lid 105 from the closed position (the first fully closed position) to the opened position (the first fully opened position) and accesses the inside of the preprocessing region via the opening portion 108, thus carrying out the maintenance. The opening portion 108 has a size set to an extent that allows the operator to access each mechanism inside the preprocessing region with both hands to perform maintenance work.

Here, the safety cover 3 and the openable lid 105 of the incubator cover 106 will be described in further detail.

As illustrated in FIG. 2, in a usual operation, the automatic analyzer 1 is operated with the safety cover 3 and the openable lid 105 of the incubator cover 106 (not illustrated in FIG. 2) closed. In the operating state of the analyzer during the usual operation, the safety cover 3 is latched by the solenoid lock mechanism 102, and the safety cover 3 cannot be opened. When maintenance, such as cleaning, is performed, the operator grips and lifts the handle portion 104 of the safety cover 3 in a state of standby or a state of system-off in which the power source of the analyzer is off to ensure that the state transitions to a state where the safety cover 3 is opened as illustrated in FIG. 3, that is, a state where the safety cover 3 is at the opened position.

As illustrated in FIG. 3, in the state where the safety cover 3 is opened, the operator can access the reagent container loading port lid 31, the openable lid 105 of the incubator cover 106, the reagent dispensing probe 11, and the reagent stirring mechanism 12 as scheduled cleaning portions on the operation surface 22. Among them, the most frequently accessed by the operator is the reagent container loading port lid 31, which is opened and closed every time the reagent containers 24 are replaced.

As illustrated in FIG. 4, the operator performs cleaning work of the configurations relating to the preprocessing inside the preprocessing region in the states where the operator grips the handle portion 104 of the safety cover 3 and moves the safety cover 3 to the opened position and where the operator pinches the openable lid knob 107 of the openable lid 105 of the incubator cover 106 to move the openable lid 105 to the opened position. In the cleaning work, the operator performs the cleaning work by inserting his/her arm into the working area via the opening portion 108 from the clearance between the incubator cover 106 and the openable lid 105, and therefore, the opening and closing amount of the openable lid 105 needs to be sufficiently large. The openable lid 105 has an open holding function that holds the opened position (the first fully opened position) against its own weight when the one end on a side distant from the center of rotation is moved to a position higher than the reference height determined in advance. The open holding function of the openable lid 105 releases the holding of the openable lid 105 such that the openable lid 105 moves to the closed position (the first fully closed position) by its own weight when the one end of the openable lid 105 is pushed down below the reference height.

As illustrated in FIG. 5, the safety cover 3 and the openable lid 105 of the incubator cover 106 according to the embodiment are configured to have a height in the vertical direction of the end on the side distant from the center of rotation of the openable lid 105 at the opened position (the first fully opened position) higher than a height in the vertical direction on an inner surface of the safety cover 3 at the closed position (the second fully closed position). Accordingly, when the safety cover 3 is closed with the openable lid 105 of the incubator cover 106 at the opened position, the openable lid 105 is brought into contact with an abutting portion 301 on the inner surface of the safety cover 3 to be pushed down below the reference height that maintains the openable lid 105 at the opened position (the first fully opened position), and the openable lid 105 is moved to the closed position (the first fully closed position) by its own weight. That is, when the openable lid 105 is at the opened position (the first fully opened position) and the safety cover 3 is at the opened position (the second fully opened position), the openable lid 105 moves to the closed position (the first fully closed position) in association with the movement of the safety cover 3 from the opened position to the closed position (the second fully closed position).

FIG. 6 is a longitudinal sectional view of the incubator cover and the openable lid.

As illustrated in FIG. 6, the incubator cover 106 and the openable lid 105 are configured with a three-layer structure of an external appearance cover 113 configuring a portion of the external appearance of the analyzer, an insulating member 114 disposed over the entire inner surface (the surface on the preprocessing region side) of the external appearance cover 113, and a light shielding member 115 disposed over the whole inner surface (the surface on the preprocessing region side) of the insulating member.

Since the external appearance cover 113 corresponds to the external appearance of the analyzer, for example, it is preferred to use one that is made of the same material and color as those of the cover members of other configurations on the operation surface 22. Since the incubator cover 106 and the openable lid 105 are contacted by the operator and the like from the outside, it is preferred to be a cover of, for example, an acrylonitrile butadiene styrene (ABS) resin or the like harder than, for example, the insulating member 114 and the light shielding member 115. In particular, the portion of the openable lid 105 that is brought into contact with the safety cover 3 is preferably configured so as to reduce abrasion caused by friction to be less likely to generate material powder and the like by using one made of a material highly resistant to friction and a material with a low friction force. Note that, for the abutting portion 301 of the safety cover 3 with the openable lid 105, a material highly resistant to friction and a material with a low friction force, a shape that reduces a friction force, and the like is used while the material and the shape of the openable lid 105 are taken into account. For example, the abutting portion 301 of the safety cover 3 abutting on the openable lid 105 has a planar structure with little catch. The abutting portion 301 is composed of a metal that hardly wears even when it is rubbed against a resin component used for the openable lid 105, a polyoxymethylene resin (POM) material with self-lubrication, or the like.

The insulating member 114 is, for example, a foam material, and may be formed by attaching or may be formed by spraying the foam material on the inner surfaces of the incubator cover 106 and the openable lid 105. The inside of the preprocessing region covered by the incubator cover 106 and the openable lid 105 has a heat-insulating function from the external environment by the insulating member 114.

The light shielding member 115 is, for example, a black sheet or black coating, and there is no problem with employing either of them. The inside of the preprocessing region covered by the incubator cover 106 and the openable lid 105 has a light shielding function from the external environment by the light shielding member 115.

The outer circumference of the opening portion 108 of the incubator cover 106, that is, a position corresponding to the outer circumference of the openable lid 105 at the closed position (the first fully closed position) is provided with, for example, a packing 117 made of sponge rubber over the entire circumference of the opening portion 108. When the openable lid 105 is closed and is at the closed position, the packing 117 seals the inside of the preprocessing region, and thus, infiltration of external air and a flow-out of internal air are prevented in the preprocessing region to maintain the temperature in the inside of the preprocessing region constant and to block infiltration of external light. The packing 117 is crushed to a constant proportion by the weight of the openable lid 105 when the openable lid 105 is at the closed position, thereby achieving higher air tightness. Note that the packing 117 is arranged and structured considering that the friction generated when the openable lid 105 is opened and closed does not wear the packing 117, and in this embodiment, it is mounted on a side of the incubator cover 106 so as to avoid powder caused by abrasion from falling from above when the openable lid 105 is opened and closed. However, it is not limited to this when the abrasion of the packing 117 can be appropriately reduced and managed, and the packing 117 may be configured to be mounted on the outer circumference of the openable lid 105.

The outer circumference of the openable lid 105 is provided with a rib 118 facing downward so as to be positioned outside the packing 117 at the closed position. What is called, a labyrinth effect can be expected by disposing the rib 118 on the outer circumference of the openable lid 105, and thus, an improvement in heat-insulating effect by reducing a flow-in of external air into the preprocessing region and a flow-out of air from the preprocessing region and an improvement in light-shielding effect by blocking the external light can be expected.

FIG. 7 and FIG. 8 are front views illustrating the incubator cover and the openable lid which are taken out. FIG. 7 is a drawing illustrating a case where the openable lid is at the closed position, and FIG. 8 is a drawing illustrating a case where the openable lid is at the opened position.

As illustrated in FIG. 8, the openable lid 105 of this embodiment has an opening angle $\theta$ at the opened position configured to be $\theta < 90°$. Accordingly, when the safety cover 3 is closed with the openable lid 105 of the incubator cover 106 at the opened position and the openable lid 105 is brought into contact with the abutting portion 301 on the inner surface of the safety cover 3, a direction of the force applied from the safety cover 3 to the openable lid 105 is a direction in which the openable lid 105 is closed (the direction of the closed position), and therefore, it is possible to reduce that a large load is applied on the configuration (for example, a hinge portion 109) of the rotation center portion of the openable lid 105. The safety cover 3 pushes the openable lid 105 in the closed position direction to push down the openable lid 105 below the reference height that maintains the openable lid 105 at the opened position (the first fully opened position), and the openable lid 105 is moved to the closed position (the first fully closed position) by its own weight. Note that the shape of the abutting portion of the openable lid 105 with the safety cover 3 may have an oblique shape that is likely to provide the openable lid 105 force in the closing direction or have an arc shape so as to have a structure that reduces a limit of the opening angle.

FIG. 9 is a flowchart illustrating a maintenance processing procedure performed by an operator.

The automatic analyzer 1 performs a reset operation when an operator selects a maintenance button (not illustrated) of a host computer 200 or the like on an operation screen or the like and determines whether it is possible for the analyzer to transition to a maintenance state or not (Step S100).

When the determination result at Step S100 is NO, that is, when the automatic analyzer 1 cannot transition to the maintenance state, the procedure returns to a selection standby state of the maintenance button. Note that when the determination result at Step S100 is NO, an alarm or the like is activated to prompt the operator to work to obtain a state ready to transition to the maintenance state.

When the determination result at Step S100 is YES, that is, when it is determined that it is ready to transition to the maintenance state, the procedure transitions to the maintenance state, and the units that hinder the operation in the maintenance are moved to retreat positions during cleaning (Step S110).

When the movement of each mechanism to the retreat position at Step S110 is completed, the operator manually moves the safety cover 3 to the opened position (the second fully opened position) in accordance with the guidance on the screen to open the safety cover 3 (Step S120), manually moves the openable lid 105 of the incubator cover 106 to the opened position (the first fully opened position) to open the openable lid 105 (Step S130), and performs cleaning of the inside of the preprocessing region (Step S140). During the cleaning, the operator, for example, performs the cleaning using a cotton swab and absorbent cotton, a cleaning agent, alcohol, and the like with rubber gloves on.

When the cleaning at Step S140 is completed, the operator, subsequently, manually moves the openable lid 105 of the incubator cover 106 to the closed position (the first fully closed position) in accordance with the guidance on the screen to close the openable lid 105 (Step S150), subsequently, manually moves the safety cover 3 to the closed position (the second fully closed position) to close the safety cover 3 (Step S160), and selects the termination of the maintenance on the screen (Step S170) to terminate the process.

Here, it is conceivable that an erroneous operation in which the safety cover 3 is manually closed with the openable lid 105 of the incubator cover 106 at the opened position could happen in the process from Step S140 to Step S160. For such an erroneous operation, besides the case where the operator unintentionally skips the operation (Step S150) of closing the openable lid 105 of the incubator cover 106, it is also conceivable the case where, for example, the operator leaves the automatic analyzer 1 during preparation or clearance of cleaning equipment and another operator closes the safety cover 3 without noticing that the openable lid 105 is open as it is in its cleaning course. However, in this embodiment, even when such erroneous operations happen, the openable lid 105 of the incubator cover 106 can be reliably closed while damage and the like are prevented by reducing the load acting on the openable lid 105 and the like, and thus, the light shielding and heat insulating properties of the preprocessing region that requires the environment control, such as the temperature adjustment and the light shielding, can be maintained.

Operational advantages in the configuration configured as described above will be explained in comparison with comparative examples.

FIG. 10 and FIG. 11 are front views illustrating incubator covers and openable lids according to a first comparative example and a second comparative example. FIG. 10 illustrates a case where the openable lid is at the opened position in the first comparative example, and FIG. 11 illustrates a case where the openable lid is at the opened position in the second comparative example.

For example, like the first comparative example illustrated in FIG. 10, when an opening angle θ at an opened position of an openable lid 105A is θ=90°, that is, in the state where the openable lid 105A at the opened position stands in the perpendicular direction viewing from the center of rotation, the openable lid 105A serves as a prop when the safety cover 3 is attempted to be closed, and a load is applied in the direction hindering the closing operation of the safety cover 3. In this state, a large load may be applied on the hinge portion 109 of the openable lid 105A to cause breakages in the worst case.

For example, like the second comparative example illustrated in FIG. 11, when an opening angle θ at an opened position of an openable lid 105B is θ>90°, the openable lid 105B is subjected to the force pushed in the opposite direction (the opening direction) of the closing direction when the safety cover 3 is attempted to be closed, and therefore, it is conceivable that an even larger load than the case illustrated in FIG. 10 is applied on the hinge portion 109 to break the hinge portion 109.

In contrast to this, in this embodiment, the opening angle θ at the opened position of the openable lid 105 of the incubator cover 106 is configured to be θ<90°, and therefore, when the safety cover 3 is closed with the openable lid 105 at the opened position, and the openable lid 105 is brought into contact with the abutting portion 301 on the inner surface of the safety cover 3, the direction of the force applied to the openable lid 105 from the safety cover 3 is the direction in which the openable lid 105 is closed (the direction of the closed position), thereby ensuring reducing a large load to be applied on the configuration (for example, the hinge portion 109) of the rotation center portion of the openable lid 105.

For example, when the openable lid in the preprocessing region is of a removable type, the openable lid removed for opening the opening portion when the maintenance work is started might be left unattached after the maintenance work is terminated. In case the preprocessing is performed without closing the opening portion of the preprocessing region, the preprocessing is performed while the light shielding and the temperature adjustment of the preprocessing region are insufficient, which possibly deteriorates the accuracy of the analysis result. For a method for preventing the openable lid from being unattached, it is possible to use a sensor that detects the open/close state but leads to a complicated structure, an increased cost, and the like. The opening portion of the preprocessing region needs a size to an extent that both hands of the operator fit, thus enlarging the removable typed openable lid, which creates a need to secure a temporary storage space.

In contrast to this, in this embodiment, when the openable lid 105 of the incubator cover 106 is at the opened position (the first fully opened position), and the safety cover 3 is at the opened position (the second fully opened position), it is configured that the openable lid 105 is moved to the closed position (the first fully closed position) in association with the movement of the safety cover 3 from the opened position (the second fully opened position) to the closed position (the second fully closed position), thereby ensuring reliably closing the openable lid 105 provided in the opening for accessing the region that requires the environment control, such as the temperature adjustment and the light shielding, and covered by the cover. Accordingly, the analytical processing can be performed with the inside of the preprocessing region sufficiently light-shielded and temperature-adjusted, thereby ensuring reduced degradation of the accuracy of the analysis result.

Second Embodiment

A second embodiment of the present invention will be described in detail with reference to FIG. 12 and FIG. 13.

This embodiment employs an openable lid that rotates in the forward direction instead of the openable lid that rotates in the upward direction in the first embodiment.

FIG. 12 and FIG. 13 are drawings illustrating an incubator cover and an openable lid which are taken out. FIG. 12 is a front view in a case where the openable lid is at an opened position, and FIG. 13 is a top view in a case where the openable lid is at the opened position. In the drawings, the members similar to those in the first embodiment are attached with the same reference numeral, and their descriptions are omitted. Note that, in FIG. 12 and FIG. 13, the state of the openable lid at the closed position is indicated by the dashed lines.

An openable lid 205 has one side (for example, an end on the left side) in the lateral direction supported swingably in the horizontal direction by a support shaft 37*a* configured to extend in the perpendicular direction.

The openable lid 205 is biased in the closing direction by a closing spring 58 stretched between a first spring hook portion 56 disposed in the incubator cover 106 and a second spring hook portion 57 disposed in the openable lid 205. The openable lid 205 has a receiving claw 59 that extends along the rotationally opening direction and is formed in a hook shape with a protruding shape on the lower side of the distal end. The receiving claw 59 is secured by a lock claw 53 at the opened position (the first fully opened position), and thus, the opened position is maintained against the biasing force in the closing direction by the closing spring 58. When the receiving claw 59 is not secured by the lock claw 53, the openable lid 205 is moved to the closed position (the first fully closed position) by the biasing force by the closing spring 58.

The lock claw 53 has one end pivotally supported swingably in the vertical direction about a horizontally arranged lock support shaft 52, and has the other end formed into a hook shape with a protruding shape on the upper side and biased from the lower side by a lock spring 55. Between the lock support shaft 52 and the distal end of the lock claw 53, a cancellation convex portion 54 is disposed so as to extend upward. Pushing this cancellation convex portion 54 downward from above ensures moving the lock claw 53 downward. The receiving claw 59 and the lock claw 53 are arranged at positions to mesh with one another when the openable lid 205 is at the opened position. When the openable lid 205 is moved to the opened position, the lock claw 53 meshes with the receiving claw 59, and thus, the opened position is maintained against the closing force by the closing spring 58.

The safety cover 3 has an inner surface provided with a cancellation protrusion 60 such that the cancellation protrusion 60 extends downward. When the safety cover 3 is moved to the closed position (the second fully closed position), the cancellation protrusion 60 is brought into contact with the cancellation convex portion 54 and pushes it down, which pushes the lock claw 53 down to cancel the engagement with the receiving claw 59, and the openable lid 205 is moved to the closed position (the first fully closed position) by the closing force by the closing spring 58.

Thus, when the safety cover 3 is closed with the openable lid 205 of the incubator cover 106 at the opened position, the cancellation protrusion 60 is brought into contact with the cancellation convex portion 54 to release the engagement between the lock claw 53 and the receiving claw 59, and the openable lid 205 is moved to the closed position (the first fully closed position) by the biasing force by the closing spring 58. That is, when the openable lid 205 is at the opened position (the first fully opened position) and the safety cover 3 is at the opened position (the second fully opened position), the openable lid 205 is moved to the closed position (the first fully closed position) in association with the movement of the safety cover 3 from the opened position to the closed position (the second fully closed position).

Other configurations are similar to those in the first embodiment.

This embodiment configured as described above can also obtain effects similar to those in the first embodiment.

Additional Remarks

Note that the present invention is not limited to the embodiments described above, and includes various modifications and combinations within the range not departing from the gist thereof. The present invention is not limited to those including all the configurations described in the embodiments above and includes those with a part of the configuration deleted.

REFERENCE SIGNS LIST

1: automatic analyzer
2: reagent cold storage
3: safety cover
4: sample conveyance mechanism
5: sample dispensing mechanism
6: tip magazine
7: tip conveyance mechanism
8: incubator
9: sample dispensing tip buffer
10: tip disposal hole
11: reagent dispensing probe
12: reagent stirring mechanism
13: washing mechanism
14: reaction liquid aspiration discharge probe
15: reaction liquid washing discharge aspiration position
16: reaction liquid stirring mechanism
17: reaction liquid aspiration position
18: detection portion
19: reaction container disposal hole
20: reaction container conveyance mechanism 21: side cover
22: operation surface
23: host computer (operation portion)
24: reagent container
25: sample container
26: sample rack
27: sample dispensing tip
28: reaction container
29: reagent disk
30: reagent container loading port
31: reagent container loading port lid
32: reagent dispensing position
37a: support shaft
52: lock support shaft
53: lock claw
54: cancellation convex portion
56, 57: spring hook portion
59: receiving claw
60: cancellation protrusion
101: interlock
102: solenoid lock mechanism
103: front cover
104: handle portion
105, 205: openable lid
105A, 105B: openable lid
106: incubator cover
108: opening portion
109: hinge portion
113: external appearance cover
114: insulating member
115: light shielding member
117: packing
118: rib
200: host computer
301: abutting portion

The invention claimed is:

1. An automatic analyzer comprising:

an operation surface including an incubator configured for receiving a container for a specimen to be analyzed;

an incubator cover which is disposed to cover a first region of the operation surface, the first region including at least a portion of the incubator and requiring at least one of temperature control or light shielding;

an openable lid which is disposed to openably cover an opening portion provided in the incubator cover, the opening portion providing access to the first region inside the incubator cover from an outside of the incubator cover, the openable lid configured to be rotatable between a first fully opened position and a first fully closed position with respect to the opening portion of the incubator cover, the openable lid configured to be movable to the first fully opened position in which a first end of the openable lid on a side distant from a center of rotation of the openable lid is positioned higher than a reference height of less than 90 degrees with respect to the first fully closed position;

a safety cover which is configured to cover the operation surface including the incubator cover and the first region, wherein the safety cover is configured to be rotatable between a second fully opened position and a second fully closed position with respect to an end of the operation surface, wherein, in the second fully closed position, the safety cover is configured to cover the openable lid, wherein, when the openable lid is at the first fully opened position and the safety cover is at the second fully opened position, the openable lid is configured to be moved to the first fully closed position due at least to contact with the safety cover during movement of the safety cover from the second fully opened position to the second fully closed position; and an airtight member which is disposed at a boundary between the openable lid and the incubator cover at the first fully closed position, and which suppresses flow-in and flow-out of air between the first region inside the incubator cover and the outside of the incubator cover, and which also suppresses infiltration of light into the first region.

2. The automatic analyzer according to claim 1, wherein the openable lid is configured to be movable to the first fully closed position at least in part by its own weight when the first end of the openable lid is moved down below the reference height due at least to the contact with the safety cover during the movement of the safety cover from the second fully opened position to the second fully closed position.

3. The automatic analyzer according to claim 1, wherein at the first fully opened position, the first end of the openable lid in a vertical direction is configured to be higher in the vertical direction than an inner surface of the safety cover at the second fully closed position.

4. The automatic analyzer according to claim 1, wherein at the first fully opened position, the first end of the openable lid in a vertical direction is configured to be higher in the vertical direction than an inner surface of the safety cover at the second fully closed position, the openable lid is configured to be movable to the first fully closed position at least in part by its own weight when the first end of the openable lid is moved down below the reference height due at least to the contact with the safety cover during the movement of the safety cover from the second fully opened position to the second fully closed position, and the inner surface of the safety cover is configured to move the openable lid down below the reference height while abutting on the first end of the openable lid, and the openable lid is configured to thereby be moved to the first fully closed position due to the movement of the safety cover from the second fully opened position to the second fully closed position.

5. The automatic analyzer according to claim 1, wherein a downward rib along an outer side of the airtight member is provided on an outer circumference of the openable lid.

* * * * *